(12) United States Patent
Bock et al.

(10) Patent No.: US 11,600,856 B2
(45) Date of Patent: Mar. 7, 2023

(54) SOLUTION-ASSISTED DENSIFICATION OF NASICON CERAMICS

(71) Applicant: National Technology & Engineering Solutions of Sandia, LLC, Albuquerque, NM (US)

(72) Inventors: Jonathan Anton Bock, Albuquerque, NM (US); Erik David Spoerke, Albuquerque, NM (US); Harlan James Brown-Shaklee, Albbuquerque, NM (US); Leo J. Small, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 170 days.

(21) Appl. No.: 17/153,607

(22) Filed: Jan. 20, 2021

(65) Prior Publication Data

US 2021/0320321 A1 Oct. 14, 2021

Related U.S. Application Data

(60) Provisional application No. 62/963,980, filed on Jan. 21, 2020.

(51) Int. Cl.
*H01M 10/0562* (2010.01)
*C04B 35/447* (2006.01)
*C04B 35/626* (2006.01)
*H01M 10/054* (2010.01)
*C04B 35/645* (2006.01)

(52) U.S. Cl.
CPC ....... *H01M 10/0562* (2013.01); *C04B 35/447* (2013.01); *C04B 35/6264* (2013.01); *C04B 35/645* (2013.01); *H01M 10/054* (2013.01); *C04B 2235/447* (2013.01); *H01M 2300/0068* (2013.01); *H01M 2300/0091* (2013.01)

(58) Field of Classification Search
CPC combination set(s) only.
See application file for complete search history.

(56) References Cited

PUBLICATIONS

Grady, Z.M. et al., "Densification of a Solid-State NASICON Sodium-Ion Electrolyte Below 400° C. by Cold Sintering With a Fused Hydroxide ," ACS Appl. Energy Mater. 2020, vol. 3, pp. 4356-4366. (Year: 2020).*

Guo, J. et al., "Cold Sintering: A Paradigm Shift for Processing and Integration of Ceramics," Angew. Chem. Int. Ed. 2016, vol. 55, pp. 11457-11461. (Year: 2016).*

Scheetz, B.E. et al., Sodium Zirconium Phosphate (NZP) as a Host Structure for Nuclear Waste Immobilzation; a Review, Waste Management, 1994, vol. 14, No. 6, pp. 489-505. (Year: 1994).*

Grady, Z.M. et al., "Densification of a Solid-State NASICON Sodium-Ion Electrolyte Below 400° C. by Cold Sintering With a Fused Hydroxide ," ACS Appl. Energy Mater. 2020, vol. 3, pp. 4356-4366.

(Continued)

*Primary Examiner* — Daniel S Gatewood
(74) *Attorney, Agent, or Firm* — Kevin W. Bieg

(57) ABSTRACT

A sodium-ion conducting NaSICON ceramic can be densified via the addition of a solvent to a NaSICON powder and subsequent pressing under high pressure and mild heat. Densification to ~90% relative density can be achieved, providing a path toward low-temperature fabrication of Na-ion conductors.

6 Claims, 4 Drawing Sheets

(56) References Cited

PUBLICATIONS

Guo, J. et al., "Cold Sintering: A Paradigm Shift for Processing and Integration of Ceramics," Angew. Chem. Int. Ed. 2016, vol. 55, pp. 11457-11461.

Ma, Q. and Tietz, F., "Solid-State Electrolyte Materials for Sodium Batteries: Towards Practical Applications," ChemElectroChem, 2020, vol. 7, pp. 2693-2713.

Scheetz, B.E. et al., Sodium Zirconium Phosphate (NZP) as a Host Structure for Nuclear Waste Immobilzation; a Review, Waste Management, 1994, vol. 14, No. 6, pp. 489-505.

* cited by examiner

SOLUTION-ASSISTED DENSIFICATION OF NASICON CERAMICS

CROSS-REFERENCE TO RELATED APPLICATION

This application claims the benefit of U.S. Provisional Application No. 62/963,980, filed Jan. 21, 2020, which are incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to sodium-ion conducting ceramics and, in particular, to the solution-assisted densification of NaSICON ceramics.

BACKGROUND OF THE INVENTION

NaSICON-based ceramic and glassy ion conductors are solid state ion conductors with the nominal composition of ($Na_{1+x}Zr_2P_{3-x}Si_xO_{12}$, $0 \leq x \leq 3$), though this composition can vary dramatically within this particular structural motif. Conventional synthesis and densification of NaSICON-based sodium-ion conductors requires high temperatures (>900° C.), often resulting in sodium volatility as well as possible non-stoichiometric liquid phase creation and phase separation. Lowering the processing temperature can help alleviate these drawbacks by, for example, preventing sodium loss and avoiding temperatures above the solidus. Moreover, the low temperature sintering allows for independent control over ceramic microstructure and densification and can facilitate conformation of ceramic and polymeric or glassy phases that are not stable at elevated temperatures.

SUMMARY OF THE INVENTION

The present invention is directed to a method for fabricating dense or continuous NaSICON ceramic or composite, comprising providing a powder of NaSICON particles, adding a solvent to the powder to at least partially dissolve the NaSICON particles in the added solvent to provide a dissolved solution, and applying a sintering pressure and a sintering temperature to the dissolved solution sufficient to reprecipitate NaSICON particles and form a dense or continuous NaSICON ceramic phase. The solvent can be an alkaline, such as NaOH, or an acid. The sintering temperature can be less than 300° C. and, preferably, less than 200° C. This process may be applicable to either a pure NaSICON ceramic material or a composite structure, integrating NaSICON-like materials with polymeric, glassy, or other materials.

BRIEF DESCRIPTION OF THE DRAWINGS

The detailed description will refer to the following drawings, wherein like elements are referred to by like numbers.

DETAILED DESCRIPTION OF THE INVENTION

Figure 1:
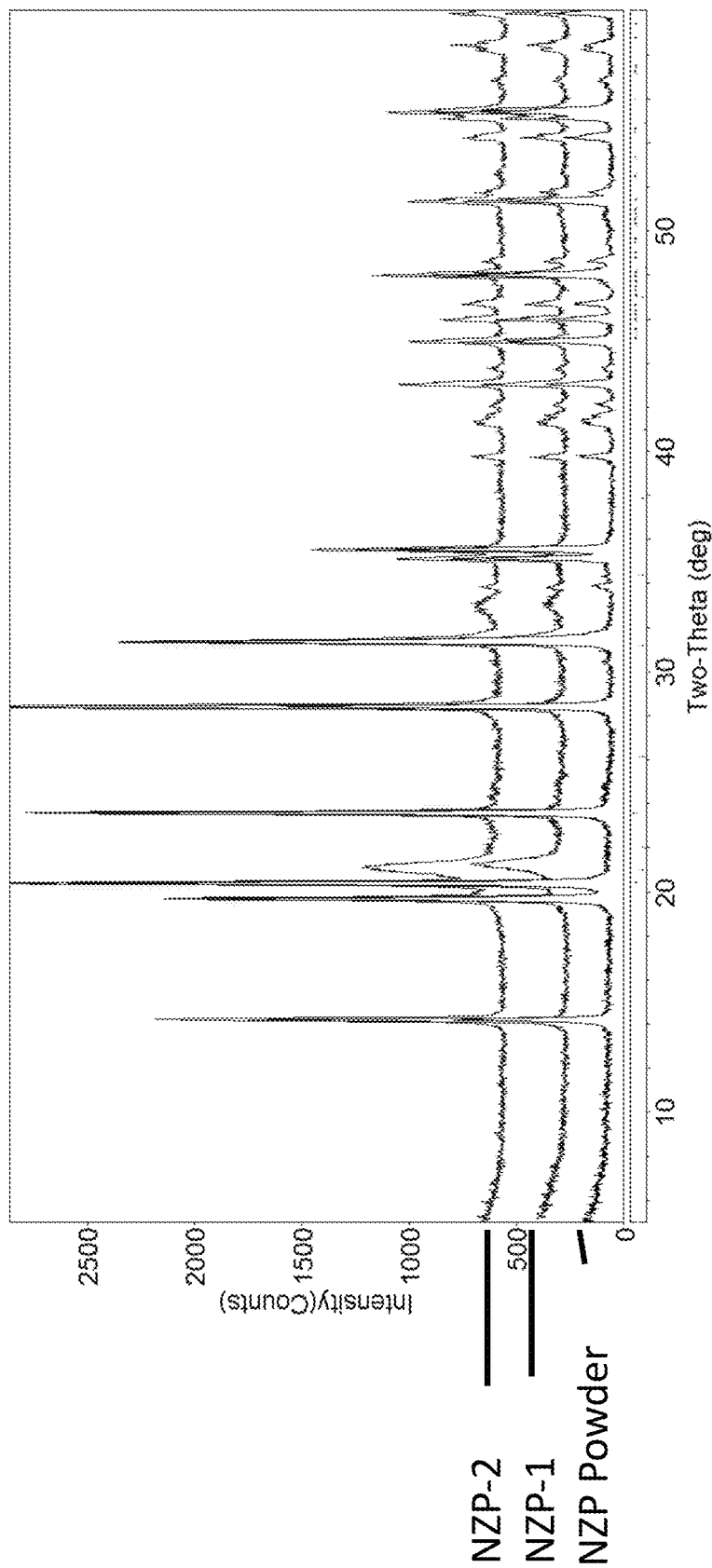
FIG. 1 shows X-Ray Diffraction (XRD) spectra of a $NaZr_2P_3O_{12}$ powder and cold-sintering $NaZr_2P_3O_{12}$ samples.

Sodium-ion conductors have potential uses as solid electrolytes in sodium-ion batteries, chemical purification, chemical sensing, and treatment of radioactive waste. Conventional densification of sodium-ion conductors requires high temperatures (>900° C.), often resulting in sodium volatility as well as possible non-stoichiometric liquid phase creation and phase separation. Densification refers to the process of consolidating particles into a contiguous structure, typically removing inter-particle volume and densifying the material. Importantly, in the present description, densification may refer more generally to local consolidation or joining of particles without a macroscopic densification step. According to the present invention, densification can be achieved at low temperatures (<300° C.) using a solution-assisted densification (cold-sintering) method. Lowering the processing temperature can help alleviate the drawbacks of high-temperature densification by, for example, preventing sodium loss and avoiding temperatures above the solidus. Moreover, low temperature sintering allows for independent control over ceramic microstructure and densification and can facilitate conformation of ceramic and polymeric or glassy phases that are not stable at elevated temperatures. In general, the sintering pressure will depend on the sintering time and temperature, but should be sufficient to keep the solvent a liquid (i.e., 22 MPa at the critical point for water) and can be significantly higher, if the pressurizing equipment allows.

NaSICON-type ceramics represent a broad family of materials that can be generally described with basic formula $A_{1+x+y}M'_xM_{2-x}B_yB'_{3-y}O_{12}$ ($0 \leq x \leq 2$, and $0 \leq y \leq 3$), which forms a three-dimensional hexagonal framework of corner-sharing oxide tetrahedra and octahedra. See Q. Ma and F. Tietz, *ChemElectroChem* 7, 2693 (2020); and B. E. Scheetz et al., *Waste Manage.* 14(6), 489 (1994). In many cases, the A represents a sodium (Na) ion or other substituting alkali ion occupying interstitial sites, while M and M' comprise multivalent transition metal cations (M is commonly tetravalent, while M' can be trivalent, tetravalent, or pentavalent) that occupy octahedral sites. B and B' form the tetrahedra and B is typically silicon and B' is typically phosphorus. The NaSICON structure can accommodate significant substitutions on A, M, and B sites, including a large fraction of the periodic table, making it a widely versatile and tailorable material. To date, the most highly conductive compositions of NaSICON-type ceramics typically involve silica and phosphate tetrahedra, zirconia octahedra, and sodium at the A site. See Q. Ma and F. Tietz, *ChemElectroChem* 7, 2693 (2020). Although the examples below describe traditional NaSICON compositions (e.g., $Na_{1+x}Zr_2Si_xP_{3-x}O_{12}$, $0 \leq x \leq 3$), the invention is generally applicable to all NaSICON-type ceramics.

The ability to densify Na-ion conductors via the solution-assisted densification method (as known as cold sintering) was demonstrated with NaSICON ceramics. As examples, cold-sintering was demonstrated with $NaZr_2P_3O_{12}$ (NZP) and $Na_3Zr_2Si_2PO_{12}$ (NZSP). As an example, ~10 wt % 10M NaOH solution was added to the starting $NaZr_2P_3O_{12}$ powder (NZP-1) and then homogenized with a mortar and pestle. The mixture was then placed into a evacuatable pellet die (No. 3619, Carver Inc., Wabash, Ind.) with an attached heater band. The evacuation stem of the pellet die was used as a feedthrough for a thermocouple, assuring close proximity of the thermocouple to the sample and accurate temperature readings. A pressure of 530 MPa was applied using a hydraulic press. The die was then heated to 150° C. while under pressure and held for 20 min. Drops in pressure were seen during densification due to pellet shrinkage, and pressure was re-applied to 530 MPa continuously. The pellet was ejected and the geometric density was measured. A relative density of 89% was achieved. In comparison, a $NaZr_2P_3O_{12}$ pellet pressed in a similar manner without 10M NaOH achieved a relative density of only 70%.

Figure 2:
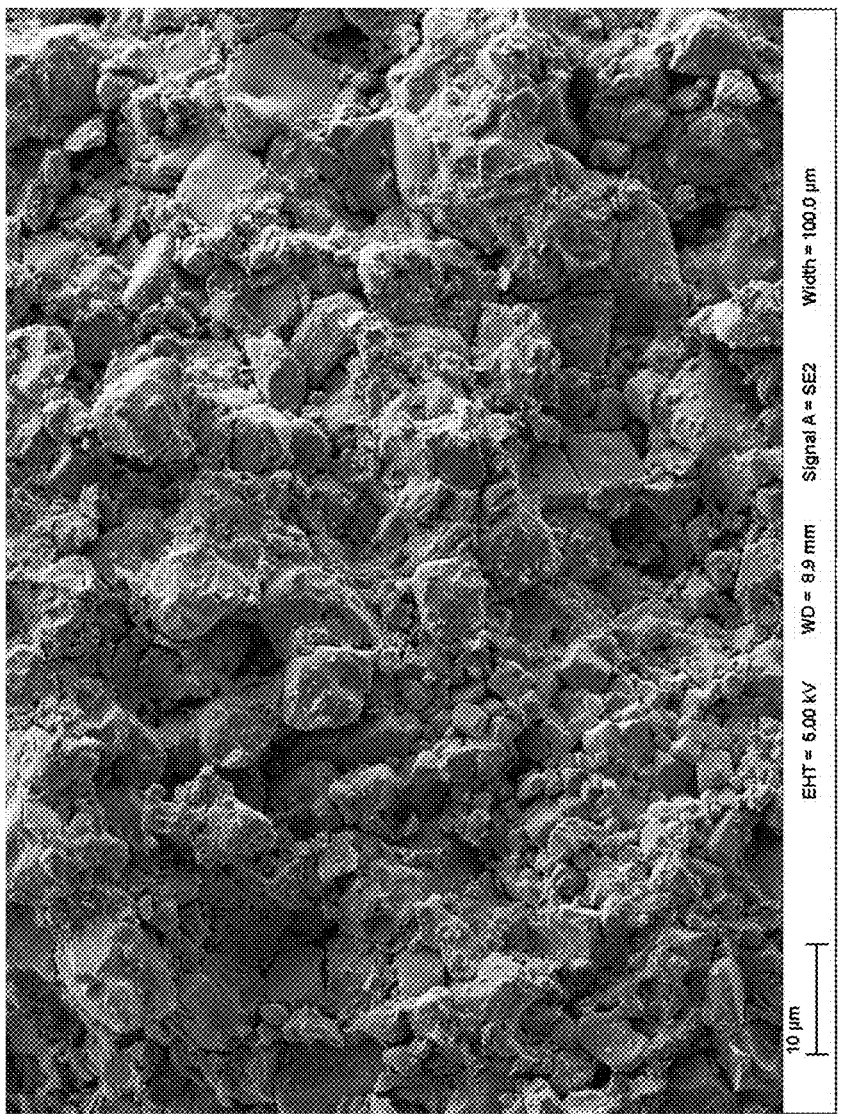
FIG. 2 is a scanning electron microscope (SEM) image of a cold-sintered NaSICON sample.

FIG. 1 shows X-Ray Diffraction (XRD) scans for spectra of a $NaZr_2P_3O_{12}$ powder (NZP) and cold-sintering $NaZr_2P_3O_{12}$ samples (NZP-1 and NZP-2). As described above, the NZP-1 sample used $NaZr_2P_3O_{12}$ powder dissolved in 10 wt % 10M NaOH and a 25° C./min ramp rate. The NZP-2 sample had a lower liquid content (8 wt % 10M NaOH), decreased ramp time (10° C./min ramp rate), and longer time at 150° C. (30 min) to increase the time in the liquid phase sintering regime. The XRD scans for the cold sintered samples indicate excellent reproduction of the phase chemistry in the densified material. The appearance of peaks near 21° and 33° are artifacts from the diffraction measurements. Note that the XRD does not show any sign of residual NaOH, suggesting the NaOH is reacting with the matrix as expected. The microstructure of the sintered material (NZP-2) is evident in the scanning electron microscopy (SEM) image shown in FIG. 2.

Figure 3:
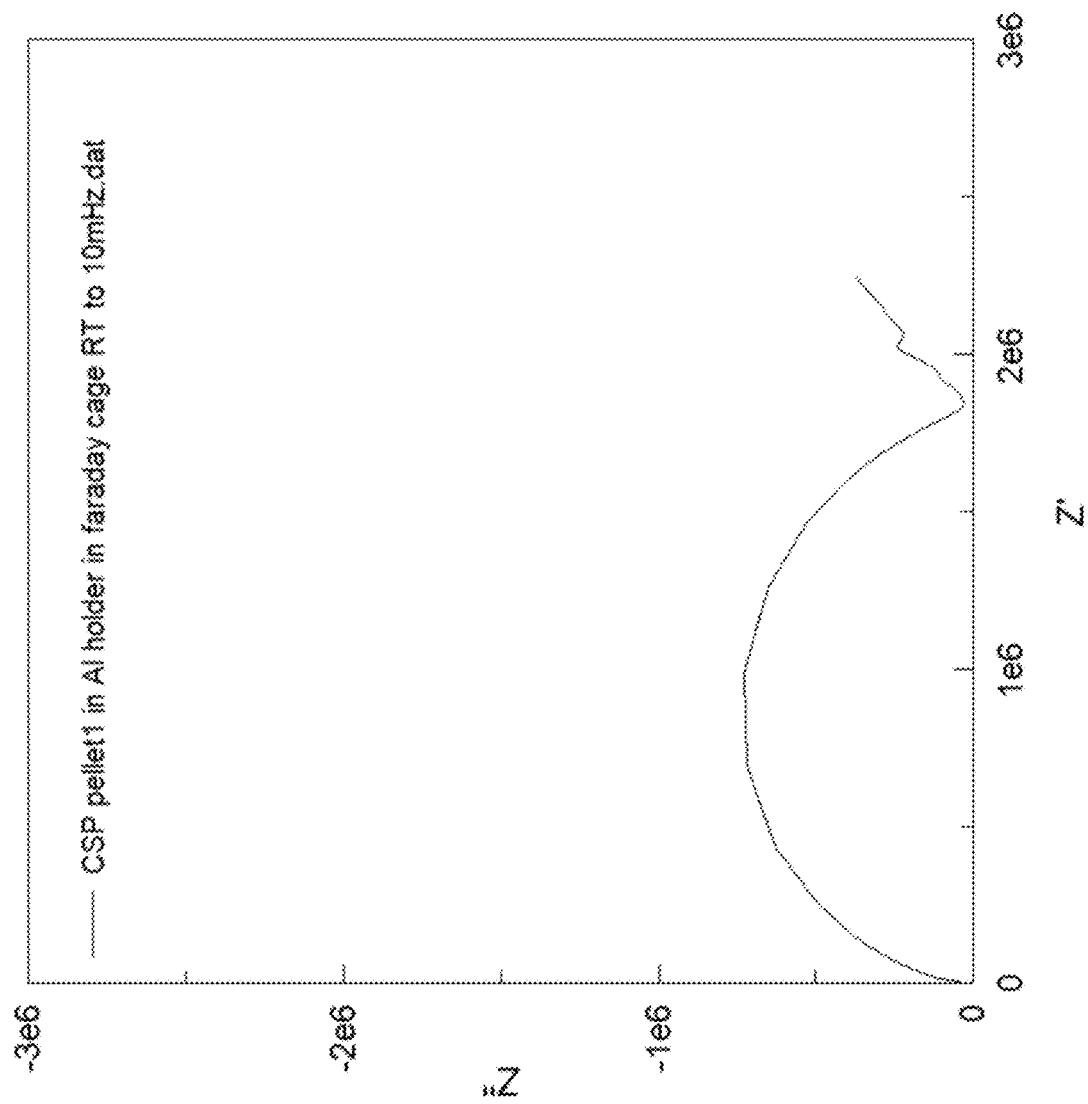
FIG. 3 is an impedance spectrum of a cold-sintered NaSICON sample.
Figure 4:
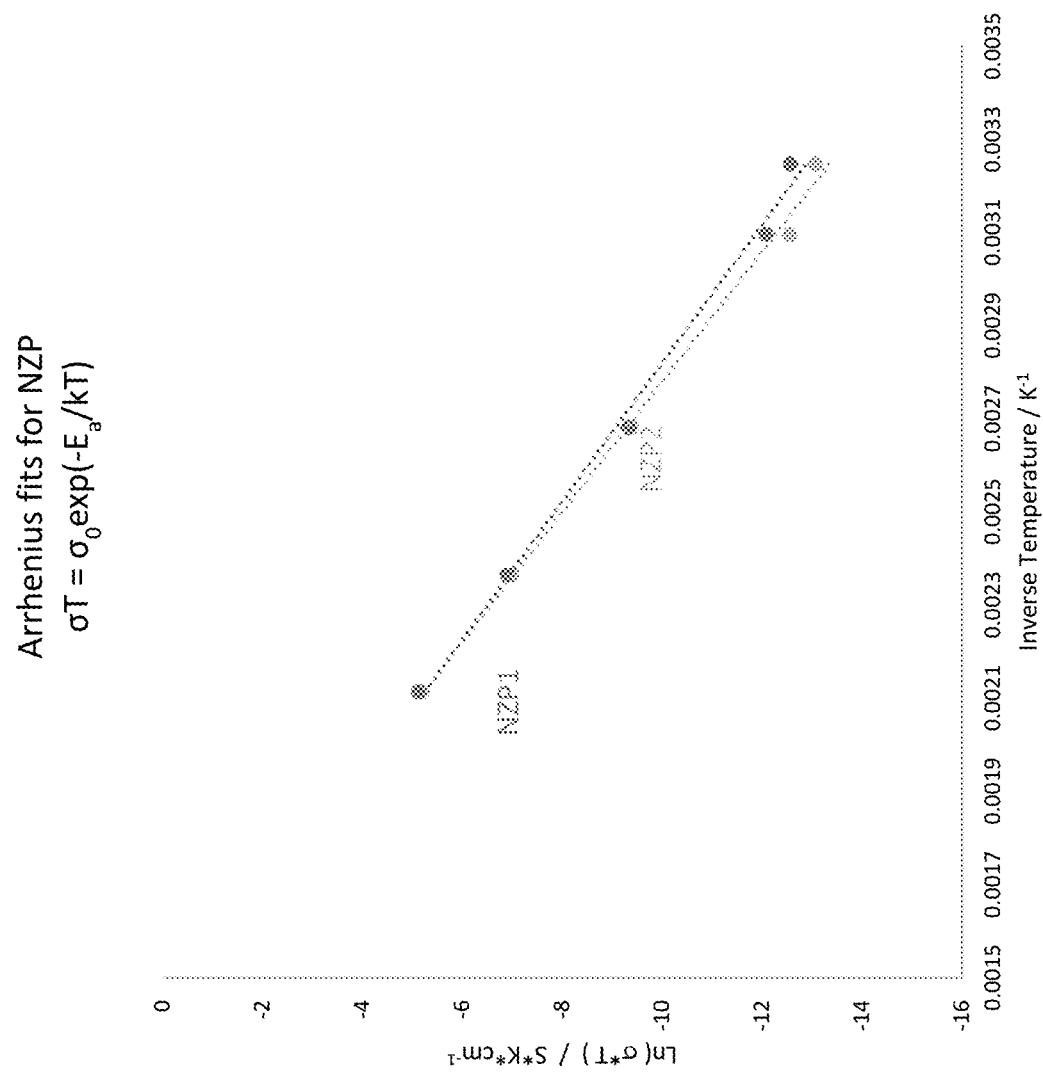
FIG. 4 is a plot of sodium ion conductivity versus temperature in cold-sintered NaSICON samples.

Ti/Pt electrodes were deposited on the sample via sputtering, and impedance spectroscopy was performed at variable temperatures. A typical impedance spectrum is shown in FIG. 3. These spectra were used to generate the data shown in Table and the Arrhenius plots shown in FIG. 4. These values are consistent with literature reports of similar NaSICON compositions (900° C. sinter+excess $Na_2O$). See H. Aono and E. Suginoto, *J. Am. Ceram. Soc.* 79, 2786 (1996).

TABLE 1

| | Na+ conductivity for (grains + grain boundaries)/S cm$^{-1}$ | | | | | |
|---|---|---|---|---|---|---|
| Sample | 200° C. | 150° C. | 100° C. | 50° C. | 35° C. | $E_a$ (eV) |
| NZP-1 | 1.17E−05 | 2.19E−06 | 2.26E−07 | 1.10E−08 | 6.87E−09 | 0.62 |
| NZP-2 | 1.26E−05 | 2.38E−06 | 2.39E−07 | 1.76E−08 | 1.13E−08 | 0.58 |

After process optimization, production of dense (>95%) NaSICON may be possible. Regardless, the ability to partially densify with a minimal thermal budget enables a reduction in the temperatures for subsequent conventional processing. That is, using solution-assisted densification as an initial step prior to conventional sintering enables conventional densification at sub-solidus temperatures with phase purity and minimum Na-volatility. Moreover, the cold sintering process allows for independent control of the ceramic microstructure (especially grain size) and densification. In conventional sintering processes, the high temperatures used for densification commonly also promote grain growth. In a material such as NaSICON, where mechanical properties and ion conduction are both affected by the grain size and distribution, the ability to create densified materials without the high temperature modification of the grain structure is very attractive.

In addition to bulk ceramic densification, this process can also be adapted for use in making composites. High temperature densification methods are not compatible with polymers, select glasses, or even other ceramic materials (including porous or ion-conducting materials). The ability to consolidate or densify the NaSICON phase in the presence of these alternative composite materials creates opportunities to form novel composite ion conducting materials.

This process may also be varied to utilize alternative solvent systems. These systems may include aqueous, organic, or mixed solvent systems to tailor the solubility of the NaSICON phase. The solvent can be alkaline, as described above, or acidic. Chelating or solubilizing additives can also be added to modify the solubility of the NaSICON during the solution-assisted densification process.

The present invention has been described as solution-assisted densification of NaSICON ceramics. It will be understood that the above description is merely illustrative of the applications of the principles of the present invention, the scope of which is to be determined by the claims viewed in light of the specification. Other variants and modifications of the invention will be apparent to those of skill in the art.

We claim:
1. A method for fabricating dense NaSICON ceramic, comprising:
   providing a powder of NaSICON particles,
   adding a NaOH solvent to the powder to at least partially dissolve the NaSICON particles in the added NaOH solvent to provide a dissolved solution, and
   applying a sintering pressure and a sintering temperature to the dissolved solution sufficient to reprecipitate NaSICON particles and form a dense NaSICON ceramic.

2. The method of claim 1, wherein the sintering temperature is less than 300° C.

3. The method of claim 1, wherein the sintering temperature is less than 200° C.

4. The method of claim 1, wherein the NaSICON ceramic comprises $Na_{1+x}Zr_2Si_xP_{3-x}O_{12}$, $0 \leq x \leq 3$.

5. The method of claim 4, wherein the NaSICON ceramic comprises $NaZr_2P_3O_{12}$ or $Na_3Zr_2Si_2PO_{12}$.

6. The method of claim 1, wherein the pH of the NaOH solvent is greater than 13.

* * * * *